(12) United States Patent
Schumann et al.

(10) Patent No.: US 7,871,013 B2
(45) Date of Patent: Jan. 18, 2011

(54) TRANSACTION PRODUCT WITH ELECTRICAL CIRCUIT

(75) Inventors: Greta Schumann, Arden Hills, MN (US); Timothy Schumann, Arden Hills, MN (US); Timothy P. Clegg, Manhatten Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 718 days.

(21) Appl. No.: 11/931,983

(22) Filed: Oct. 31, 2007

(65) Prior Publication Data

US 2009/0108078 A1    Apr. 30, 2009

(51) Int. Cl.
G06K 19/06 (2006.01)
G06K 19/00 (2006.01)
G06Q 40/00 (2006.01)

(52) U.S. Cl. .................. 235/492; 235/487; 235/493; 283/904; 902/25; 902/26; 902/27; 705/41; 206/459.1

(58) Field of Classification Search .............. 235/487, 235/492, 493; 283/904; 902/25–27; 705/41; 206/459.1
See application file for complete search history.

(56) References Cited

U.S. PATENT DOCUMENTS

| | | | |
|---|---|---|---|
| 3,351,268 | A | 11/1967 | Schroeder |
| 3,715,624 | A | 2/1973 | Herman |
| 4,055,014 | A * | 10/1977 | Schmidt et al. ............... 40/442 |
| 4,299,041 | A * | 11/1981 | Wilson .................... 40/124.02 |
| 4,791,741 | A | 12/1988 | Kondo |
| D305,887 | S | 2/1990 | Nishimura |
| 5,031,914 | A | 7/1991 | Rosenthal |
| 5,063,698 | A | 11/1991 | Johnson et al. |
| 5,275,285 | A | 1/1994 | Clegg |
| 5,359,374 | A | 10/1994 | Schwartz |
| 5,387,108 | A | 2/1995 | Crowell |
| 5,539,819 | A | 7/1996 | Sonoyama et al. |
| 5,577,918 | A | 11/1996 | Crowell |
| 5,641,164 | A | 6/1997 | Doederlein et al. |
| 5,774,861 | A | 6/1998 | Spector |

(Continued)

FOREIGN PATENT DOCUMENTS

GB    2277482 A    11/1994

OTHER PUBLICATIONS

Photographs of the Wii gift card publicly offered for retail sale in Target stores at least as early as Nov. 5, 2006, 2 pages.

(Continued)

*Primary Examiner*—Daniel Walsh
(74) *Attorney, Agent, or Firm*—Griffiths & Seaton PLLC

(57) ABSTRACT

A transaction product includes a support member, an electrical circuit, a button and an account identifier. The support member at least partially depicts a measurement device. The electrical circuit is coupled to the support member, and the button is in communication with the electrical circuit such that user interaction with the button activates the electrical circuit causing the electrical circuit to automatically indicate a reading of the measurement device. The account identifier links the transaction product to an account or record and is machine readable. Other cards, products, assemblies and methods of using such cards, products and assemblies are also disclosed.

22 Claims, 13 Drawing Sheets

U.S. PATENT DOCUMENTS

| | | | |
|---|---|---|---|
| 5,778,574 | A | 7/1998 | Reuben |
| 5,789,733 | A | 8/1998 | Jachimowicz et al. |
| 5,918,909 | A | 7/1999 | Fiala et al. |
| 5,927,846 | A | 7/1999 | Sinclair |
| D420,610 | S * | 2/2000 | Pinchuk ............... D10/104 |
| 6,019,284 | A | 2/2000 | Freeman et al. |
| 6,028,752 | A | 2/2000 | Chomette et al. |
| 6,068,183 | A | 5/2000 | Freeman et al. |
| 6,070,990 | A | 6/2000 | Dalton et al. |
| D429,733 | S | 8/2000 | Jones et al. |
| 6,109,762 | A | 8/2000 | Hallgrimsson et al. |
| 6,144,352 | A | 11/2000 | Matsuda et al. |
| D436,991 | S | 1/2001 | Morgante |
| 6,356,626 | B1 | 3/2002 | Ohara et al. |
| 6,402,039 | B1 | 6/2002 | Freeman et al. |
| 6,409,360 | B2 | 6/2002 | Contant et al. |
| 6,412,775 | B1 | 7/2002 | Dear |
| 6,447,143 | B2 | 9/2002 | Krietzman et al. |
| 6,454,435 | B1 | 9/2002 | Altman |
| 6,508,569 | B2 | 1/2003 | Krietzman et al. |
| 6,533,436 | B2 | 3/2003 | Krietzman et al. |
| 6,543,809 | B1 | 4/2003 | Kistner et al. |
| 6,607,136 | B1 | 8/2003 | Atsmon et al. |
| 6,769,618 | B1 | 8/2004 | Finkelstein |
| 6,789,802 | B2 | 9/2004 | Hornia |
| 6,817,532 | B2 | 11/2004 | Finkelstein |
| 6,902,116 | B2 | 6/2005 | Finkelstein |
| D525,711 | S * | 7/2006 | Lewandowski ............ D24/200 |
| 7,434,735 | B2 * | 10/2008 | Dean et al. ................. 235/487 |
| 7,704,135 | B2 * | 4/2010 | Harrison, Jr. ................... 463/7 |
| 2002/0017759 | A1 | 2/2002 | McClung, III et al. |
| 2002/0066789 | A1 | 6/2002 | Yen |
| 2002/0112250 | A1 | 8/2002 | Koplar et al. |
| 2002/0143697 | A1 | 10/2002 | Gotfried |
| 2002/0169608 | A1 | 11/2002 | Tamir et al. |
| 2003/0022586 | A1 | 1/2003 | Beged-Dov |
| 2003/0061132 | A1 * | 3/2003 | Yu et al. ...................... 705/30 |
| 2003/0106935 | A1 * | 6/2003 | Burchette, Jr. ............. 235/380 |
| 2003/0107884 | A1 | 6/2003 | Krietzman et al. |
| 2003/0132300 | A1 | 7/2003 | Dilday et al. |
| 2003/0155425 | A1 | 8/2003 | Lynch |
| 2003/0192209 | A1 | 10/2003 | Yeh |
| 2004/0028235 | A1 | 2/2004 | Pan |
| 2004/0032732 | A1 | 2/2004 | Rubin |
| 2004/0055188 | A1 | 3/2004 | Dolan-King |
| 2004/0238625 | A1 | 12/2004 | Walker et al. |
| 2005/0052882 | A1 | 3/2005 | Lath |
| 2005/0090181 | A1 | 4/2005 | Helou |
| 2005/0207165 | A1 | 9/2005 | Shimizu et al. |
| 2005/0211785 | A1 * | 9/2005 | Ferber et al. ................ 235/492 |
| 2005/0236490 | A1 | 10/2005 | Fortune et al. |
| 2005/0246928 | A1 | 11/2005 | Lee |
| 2006/0108429 | A1 * | 5/2006 | Waters ........................ 235/487 |
| 2006/0157555 | A1 * | 7/2006 | Dean et al. .................. 235/380 |
| 2006/0157556 | A1 * | 7/2006 | Halbur et al. ............... 235/380 |
| 2006/0161439 | A1 | 7/2006 | Selg et al. |
| 2007/0170263 | A1 * | 7/2007 | Waters ........................ 235/487 |
| 2007/0214093 | A1 * | 9/2007 | Colella ........................ 705/67 |
| 2007/0290052 | A1 * | 12/2007 | Dean et al. .................. 235/492 |
| 2008/0065492 | A1 * | 3/2008 | Halbur et al. ................. 705/14 |
| 2008/0067247 | A1 * | 3/2008 | McGregor et al. .......... 235/439 |
| 2009/0090771 | A1 * | 4/2009 | Dean et al. .................. 235/380 |
| 2009/0112101 | A1 * | 4/2009 | Furness et al. .............. 600/477 |
| 2009/0184170 | A1 * | 7/2009 | Clegg et al. ................. 235/494 |
| 2009/0272796 | A1 * | 11/2009 | Ong ............................ 235/379 |
| 2009/0322477 | A1 * | 12/2009 | Celorio ...................... 340/5.82 |
| 2010/0056021 | A1 * | 3/2010 | Carlson et al. .............. 446/487 |

OTHER PUBLICATIONS

"Have you been NAUGHTY or NICE?", http://www.icqgreetings.com/xmas/meter.htm, printed on May 8, 2007, 2 pages.

"Home Depot Tape Measure Gift Cards—Review," http://www.toolsnob.com/archives/2007/06/home_depot_tape_measure_gift_c_1.php, Jun. 19, 2007, 4 pages.

"Credit Union Tech Talk," http://www.cunews.com/newsletters/2004419.htm, Apr. 19, 2004, 8 pages.

* cited by examiner

TRANSACTION PRODUCT WITH ELECTRICAL CIRCUIT

BACKGROUND OF THE INVENTION

Stored-value cards and other transaction cards come in many forms. A gift card, for example, is a type of stored-value card that includes a pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction cards provide a number of advantages to both the consumer and the retailer.

SUMMARY OF THE INVENTION

One aspect of the present invention relates to a transaction product including a support member, an electrical circuit, a button and an account identifier. The support member at least partially depicts a measurement device. The electrical circuit is coupled to the support member, and the button is in communication with the electrical circuit such that user interaction with the button activates the electrical circuit causing the electrical circuit to automatically indicate a reading of the measurement device. The account identifier links the transaction product to an account or record and is machine readable. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

The following detailed description merely provides examples of the invention and is not intended to limit the invention or the application and uses of the invention. Furthermore, there is no intention to be bound by any theory presented in the preceding background of the invention or the following detailed description of the invention.

A gift card or other transaction product is adapted for making purchases of goods and/or services from e.g., a retail store or website. According to one embodiment, an original consumer buys the transaction product to give a recipient who in turn is able to use the transaction product at a retail store or setting to pay for goods and/or services. The transaction product, according to embodiments of the present invention, provides the consumer and recipient with extra functionality in addition to the ability to pay for goods and/or services with the transaction product. In particular, the transaction product presents the original consumer and/or other bearer of the transaction product with a variable visual presentation, which, in one embodiment, is provided with an accompanying audio presentation.

More specifically, in one example, the transaction product depicts a meter or scale extending between a first limit and a second opposite limit. For instance, where the transaction product is offered in connection with the Christmas holiday, the meter may be a naughty-or-nice meter having a first limit of naughty at one end of the meter and a second limit of nice at an opposite end of the meter. Upon user interaction with a button or switch of the transaction product, the transaction product is configured to automatically indicate to the user where she registers on the meter, for example, whether she is naughty, nice or somewhere in between. In one embodiment, the transaction product is configured to randomly indicate (rather than actually measuring) a reading on the meter in a manner providing amusement to the user and thereby promoting purchase of the transaction product.

Figure 6:
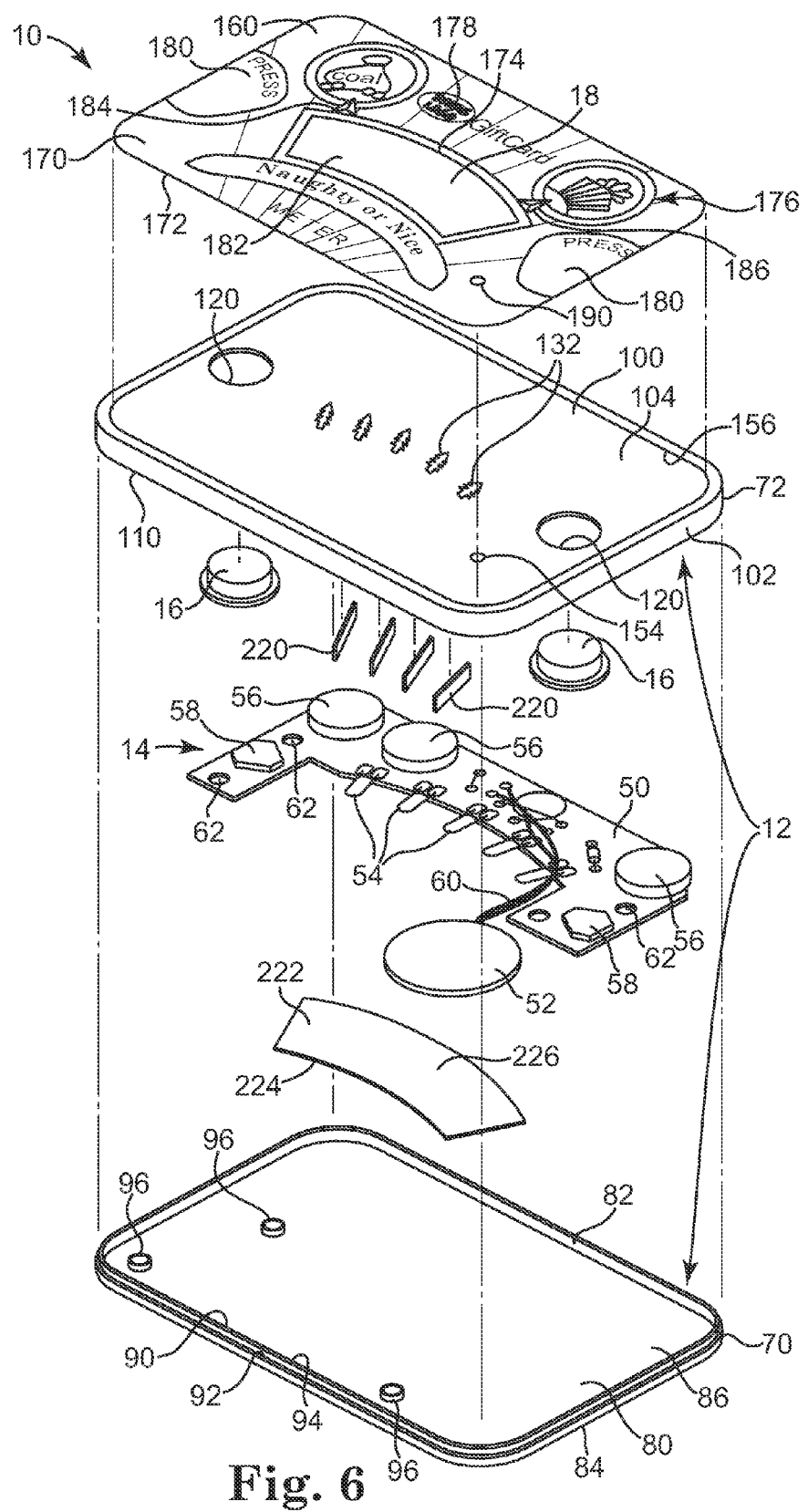
FIG. 6 is an exploded, perspective view illustration of the transaction product of FIG. 1, according to one embodiment of the present invention.

Turning to the figures, FIGS. 1-6 illustrate one embodiment of a transaction product 10 such as a stored-value product (e.g., gift card, phone card, etc.), credit product, etc.

according to the present invention. Transaction product 10 is configured to be used toward the purchase and/or use of goods and/or services and includes an enclosure or housing 12, an electrical circuit 14 (FIG. 6) and one or more buttons 16 (FIG. 6). In one embodiment, electrical circuit 14 is enclosed within housing 12, and each button 16 is at least partially positioned within housing 12 and configured to interact with electrical circuit 14. In particular, in one example, where transaction product 10 depicts a meter 18 or similar representation of a measuring instrument (e.g., a scale), upon user interaction with button(s) 16 (e.g., pressing, switching or other suitable movement of button(s) 16), electrical circuit 14 is activated to automatically indicate a reading on meter 18 depicted by transaction product 10.

Transaction product 10 includes an account identifier 20 (FIG. 3) such as a bar code, magnetic strip, a smart chip or other electronic device, a radio frequency identification (RFID) device or other suitable identifier readily machine readable by a point-of-sale terminal or other account access station or kiosk. Account identifier 20 indicates an account or record to which transaction product 10 is linked. The account or record of the monetary or other balance on transaction product 10 optionally is maintained on a database, other electronic or manual record-keeping system or, in the case of "smart" cards for example, on a chip or other electronic devices on transaction product 10 itself. Accordingly, by scanning account identifier 20, the account or record linked to transaction product 10 is identified and can subsequently be activated, have amounts debited therefrom and/or have amounts added thereto.

In one embodiment, account identifier 20 includes a character string or code 22 (e.g., a number and/or letter string) configured to provide additional security to the user of transaction product 10 and/or configured to be read by a bearer of transaction product 10 to facilitate use of transaction product 10 for web site or other purchases outside of brick-and-mortar type retail establishments. With the above in mind, account identifier 20 is one example of means for linking transaction product 10 with an account or record, and scanning of account identifier 20 is one example of means for activating or loading value on transaction product 10.

Referring to the exploded perspective view of FIG. 6, electrical circuit 14 includes a printed circuit board (PCB) 50, a speaker 52, a plurality of lights 54, one or more power source 56 and one or more activation switch 58. In one embodiment, lights 54 and power source(s) 56 are each mounted to PCB 50 and are each placed in electrical communication with one another with wiring or in any other suitable manner. In one embodiment, PCB 50 includes electrical traces, one or more resistors, one or more capacitors and/or any suitable number of other electrical components facilitating the proper function of electrical circuit 14 and/or electrical connection of electrical components mounted on PCB 50. In one example, speaker 52 is not mounted to PCB 50 but rather is electrically coupled with the remainder of electrical circuit 14 via wires 60 or other suitable electrical coupling devices.

In one example, PCB 50 defines one or more apertures 62 sized, shaped and positioned to receive features of housing 12, as will further be described below, to facilitate alignment, positioning and/or coupling of PCB 50 to housing 12 or other components of transaction product 10. Although primarily described herein as including a single PCB 50, upon reading this application, one of ordinary skill in the art will recognize that multiple printed circuit boards may be utilized wherein the multiple printed circuit boards and/or the components mounted thereon are electrically coupled to one another.

Speaker 52 is any suitable speaker capable of converting electrical impulses into sound waves perceivable by the bearer of transaction product 10, e.g., the customer and/or recipient. Electrical circuit 14 with speaker 52 is one example of means for generating sound or an audio signal with transaction product 10.

User interaction with one or more activation switch 58 is configured to activate electrical circuit 14 to perform a particular generally non-transactional function. In one embodiment, each activation switch 58 is a snap or pressure sensitive domed switch mounted to PCB 50. More specifically, interaction with one or more activation switch 58 serves to close a connection within electrical circuit 14 and to activate electrical circuit 14 to perform a task or function corresponding with the activated switch 58 as will be further described below.

The one or more power sources 56 each provide electrical power to electrical circuit 14. In one embodiment, each power source 56 is an alkaline battery or any other suitable battery. In one embodiment, during periods of non-use of electrical circuit 14, the amount of power provided by power sources(s) 56 to other components of electrical circuit 14 is decreased to prolong the overall functional life span of electrical circuit 14.

During assembly of electrical circuit 14, in one embodiment, each of lights 54 is coupled to and configured to extend (e.g., in a cantilever fashion) from PCB 50. The one or more power sources 56 are coupled to PCB 50 and placed in electrical communication with lights 54 such that the one or more power sources 56 can selectively provide power thereto. Each activation switch 58 is placed in electrical circuit 14 and is configured to at least partially close electrical circuit 14 to allow power from power source(s) 56 to reach lights 54. In one embodiment, where two or more activation switches 58 are provided, bearer interaction with any one of activation switches 58 will activate electrical circuit 14. In one embodiment, where two or more activation switches 58 are provided, in order to activate electrical circuit 14, a bearer interacts with two or more (e.g., all) of activation switches 58.

In one embodiment, upon activation of electrical circuit 14, lights 54 are configured to be illuminated or lit in a variable light sequence or pattern (i.e., a pattern that is not the same every time electrical circuit 14 is activated). For example, where lights 54 are positioned in a single row array (e.g., a single linear, curvilinear or otherwise non-linear row array), upon activation, lights 54 are selectively lit or illuminated in a variable or random light pattern or presentation.

For example, during a first portion of the light pattern, individual ones of lights 54 are selectively illuminated in a sequence of relatively short periods of time. In one embodiment, the light pattern terminates in prolonged illumination of one or a group of lights 54, as compared to the relatively short time periods of illumination of lights 54 during first portion of the light pattern. In one example, the only ones of lights 54 that are illuminated for a prolonged period of time at the end of each light pattern (e.g., a second portion of the light pattern) are the ones of lights 54 positioned at either far end of the single array/row (i.e., the first and the last lights 54 in the array).

In one example, where speaker 52 is included in electrical circuit 14, activation of electrical circuit 14 via interaction with activation switch(es) 58, also causes electrical circuit 14 to output an audio signal via speaker 52. The audio signal can be any suitable audio signal stored to electrical circuit 14, and in one embodiment, the audio signal is specifically configured to coordinate with the variable light presentation collectively provided by lights 54. For example, the audio signal may include relatively short tones that quickly change during the first portion of the light pattern (i.e., during a period of relatively short illumination of individual lights 54) and/or may provide a prolonged tone upon final illumination of one or more lights 54 for a prolonged period of time at the end of each light pattern. In one example, speaker 52 and, therefore, playing of any audio signal(s) is eliminated. Other variables in electrical circuit 14 will be apparent to those of skill in the art upon reading this application.

In one embodiment, housing 12 includes a first support or housing member 70 and a second support or housing member 72. In one embodiment, first housing member 70 is a base, and second housing member 72 is a cover. In one embodiment, base 70, as described with reference to FIGS. 3 and 6, generally includes a primary panel 80 and a side wall 82. Primary panel 80 is generally planar and defines an outside surface 84 (FIG. 3) and an inside surface 86 (FIG. 6) opposite outside surface 84. In one embodiment, primary panel 80 is generally rectangular and sized similar to an identification card, a credit card or other card sized to fit in a wallet of a user. In other embodiments, primary panel 80 is otherwise shaped as a square, circle, oval, star or any other suitable shape.

Side wall 82 extends from inside surface 86 away from outside surface 84 and, in one example, substantially about an entire perimeter of primary panel 80. In one embodiment, side wall 82 extends with a generally perpendicular orientation relative to primary panel 80. Side wall 82 extends from primary panel 80 to define an inside edge 90 opposite primary panel 80. In one example, inside edge 90 is formed as a stepped edge including a first portion 92 and a second portion 94. First portion 92 extends from primary panel 80 a smaller distance than second portion 94 extends from primary panel 80, as illustrated with reference to FIG. 6. In one example, first portion 92 extends generally about a perimeter of second portion 94. In this respect, inside edge 90 is formed as a stepped edge with the higher, second portion 94 being positioned just inside lower, first portion 92. In one embodiment, at least first portion 92 forms curved or chamfered corners at each corner, if any, defined by side wall 82.

In one embodiment, cylindrical protrusions 96 extend from inside surface 86 of primary panel 80 in a direction substantially parallel to side wall 82. In one example, each cylindrical protrusion 96 is at least partially hollow so as to receive a corresponding feature of cover 72, as will be further described below, to facilitate alignment and coupling of base 70 with cover 72. Other features configured to facilitate alignment and coupling of base 70 and cover 72 are also contemplated.

Figure 1:
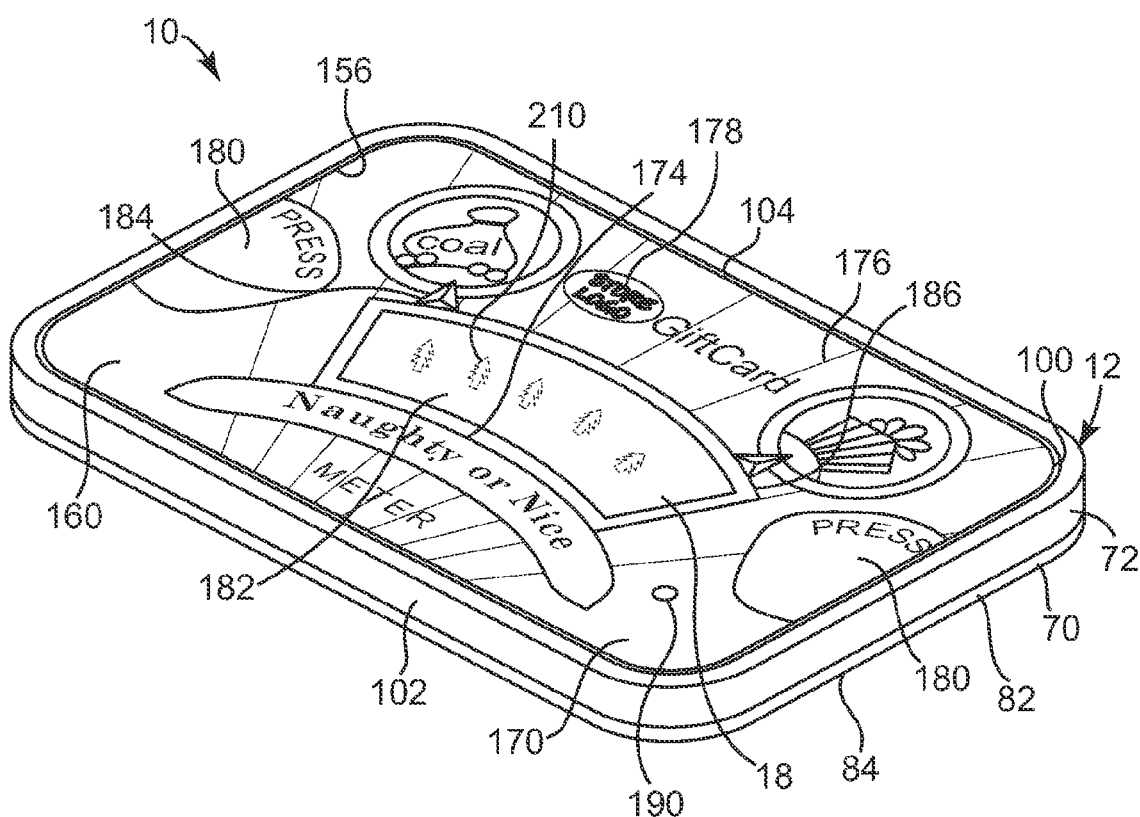
FIG. 1 is a perspective view illustration of a transaction product, according to one embodiment of the present invention.

One embodiment of cover 72 is illustrated with reference to FIGS. 1, 6 and 7. Cover 72 generally includes a primary panel 100 and a side wall 102. Primary panel 100 is generally planar and defines an outside surface 104 (FIGS. 1 and 6) and an inside surface 106 (FIG. 7) opposite outside surface 104. In one embodiment, primary panel 100 is generally sized similar to primary panel 80 of base 70. Side wall 102 extends from inside surface 106 about a substantial entirety of a perimeter of primary panel 100. For example, side wall 102 extends with a generally perpendicular orientation relative to primary panel 100.

Side wall 102 extends from primary panel 100 to collectively form an inside edge 110 opposite primary panel 100. In one embodiment, inside edge 110 is a stepped edge including a first portion 112 and a second portion 114. In one embodiment, first portion 112 extends from primary panel 100 a further distance than second portion 114 extends from primary panel 100. First portion 112 extends around the perimeter of second portion 114. In this respect, inside edge 110 is formed as a stepped edge with lower, second portion 114 being positioned just inside higher, first portion 112. In one embodiment, the corners of inside edge 110 formed at corners of side walls 82, if any, are rounded or chamfered.

Figure 7:
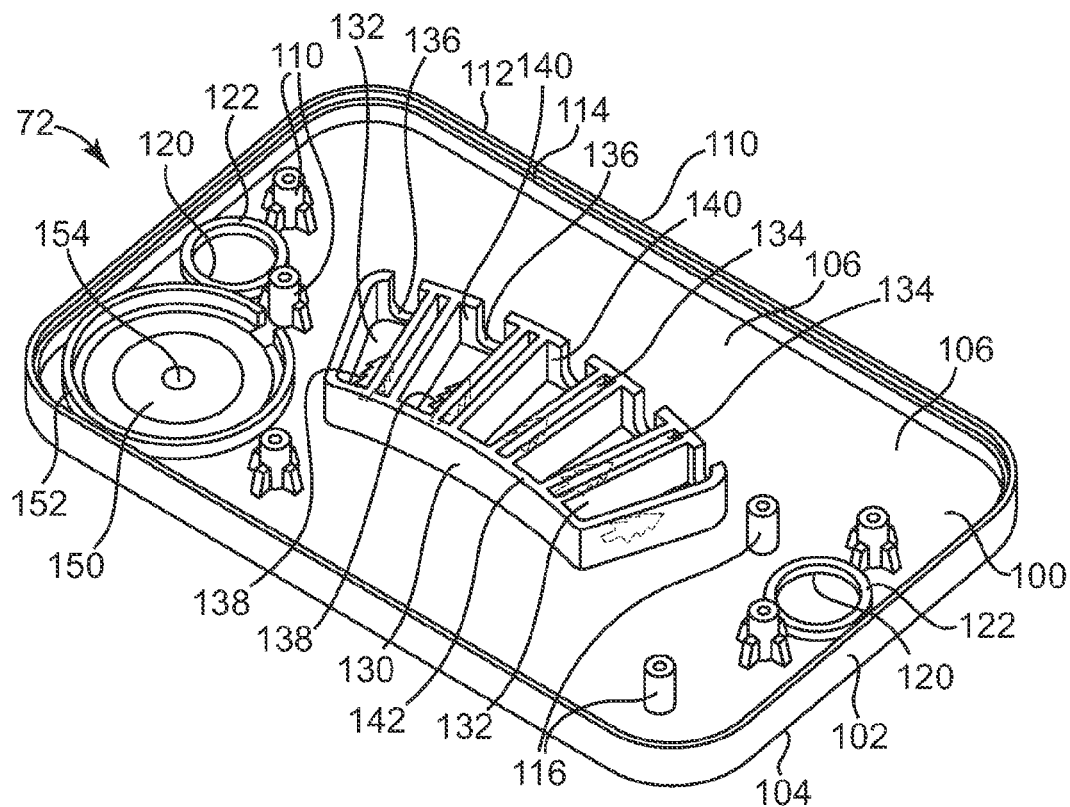
FIG. 7 is an inside perspective view illustration of a cover of the transaction product of FIG. 1, according to one embodiment of the present invention.

Referring to FIG. 7, in one example, cover 72 includes a plurality of protrusions 116 (e.g., substantially cylindrical protrusions, etc.) extending from inside surface 106 parallel to side wall 102. Some of the plurality of protrusions 116 are positioned on cover 72 to generally align with cylindrical protrusions 96 of base 70 (FIG. 6) upon assembly of housing 12 to facilitate alignment and coupling of base 70 with cover 72. Others of the plurality of protrusions 116 are configured to facilitate alignment and coupling with various components of electrical circuit 14 such as PCB 50, as will be further described below.

In one embodiment, button apertures 120 extend through primary panel 100. Each button aperture 120 is sized and shaped to receive one of buttons 16. In one embodiment, a raised rim 122 extends away from inside surface 106 generally around the perimeter of each button aperture 120. In one example, button apertures 120 and the corresponding raised rims 122 are positioned to correspond with the positioning of electrical circuit 14, more specifically, with activation switches 58 of electrical circuit 14, as will be further described below.

Cover 72 includes internal walls 130 extending away from inside surface 106 of cover 72 with an orientation that, in one embodiment, is substantially parallel to the extension of side wall 102 from inside surface 106. Internal walls 130, more specifically, extend from inside surface 106 to define an edge 142 opposite primary panel 100. In one embodiment, edge 142 is positioned further away from inside surface 106 than inside edge 110 of side wall 102. Internal walls 130 and primary panel 100 are configured to collectively define light cavities 132 and blocking cavities 134 that are not generally in communication with or otherwise open to one another. Upon assembly, each light cavity 132 is configured to receive one or more of lights 54 of electrical circuit 14 as will be further described below. As such, light cavities 132 are positioned in an array complementing the array of lights 54 such that each lights 54 fits relatively easily into a corresponding light cavity 132. In one example, a light reception aperture 136 is formed through an end wall 140 of each light cavity 132 to allow at least one light 54 to enter the corresponding light cavity 132 therethrough.

Primary panel 100 defines a plurality of light emission apertures 138 extending therethrough (from outside surface 104 to inside surface 106). At least one light emission aperture 138 is defined within each light cavity 132. Each light emission aperture 138 provides a path for emitting light/illumination from each light 54 out of housing 12, more particularly, out of the corresponding light cavity 132. In one example, each of the plurality of light emission apertures 138 is shaped to correspond with meter 18 and/or meter indicia 174 (described below) of transaction product 10. For instance, where meter 18 is a naughty-or-nice meter or other meter associated with the Christmas holiday, each of the plurality of light emission apertures 138 is shaped as a Christmas tree, a stocking, a candy cane, a reindeer or any other shape readily associated with the Christmas holiday. Other shapes of light emission apertures 138 (e.g., arrows, tick marks, or dots) will be apparent to those of skill in the art upon reading the present application.

In one embodiment, one of blocking cavities 134 is defined between a different two, otherwise adjacent ones of light cavities 132, and each blocking cavity 134 is characterized by an absence of one of lights 54 or any other light sources. Blocking cavities 134 serve to space light cavities 132 from one another to decrease the amount of light emitted within one light cavity 132 that enters a second, generally adjacent light cavity 132. As such, in one embodiment, internal walls 130 at least partially define alternating light cavities 134 and blocking cavities 132.

A speaker reception area 150 may be defined by inside surface 106 of cover 72. In particular, in one embodiment, a rim 152 sized similar to or slightly larger than a speaker 52 (e.g., FIG. 6) of electrical circuit 14, which will be further described below, extends from inside surface 106 in a direction generally parallel to side wall 102. Rim 152 is configured to receive and/or at least partially surround speaker 52 upon assembly in a manner substantially fixing speaker 52 in place relative to cover 72.

In one example, at least one speaker aperture 154 is defined through primary panel 100 within speaker reception area 150. Each speaker aperture 154 is configured to facilitate transfer of sound from speaker 52 out of housing 12, and therefore, out of transaction product 10, during use. Although described above as being included in cover 72, in one embodiment, one or more of speaker reception area 150, rim 152 and the one or more speaker apertures 154 are defined at least in part by base 70.

In view of the above, outside surface 104 at least partially defines button apertures 120 and the one or more speaker apertures 154. In addition, in one embodiment, a panel indentation 156 (FIG. 6) is defined on outside surface 104 of cover 72 and is sized and configured to receive a face panel 160 (e.g., FIGS. 1 and 6) as will be further described below.

In one embodiment, each of base 70 and cover 72 is formed by injection molding plastic (e.g., polycarbonate, polystyrene, polyvinyl chloride (PVC), acrylonitrile butadiene styrene (ABS), polyethylene terephthalate (PET), teslin, polyactide (PLA) and acrylic) or other suitable material to define the various attributes of base 70 and cover 72. Other methods of forming base 70 and cover 72 are also contemplated.

Figure 3:
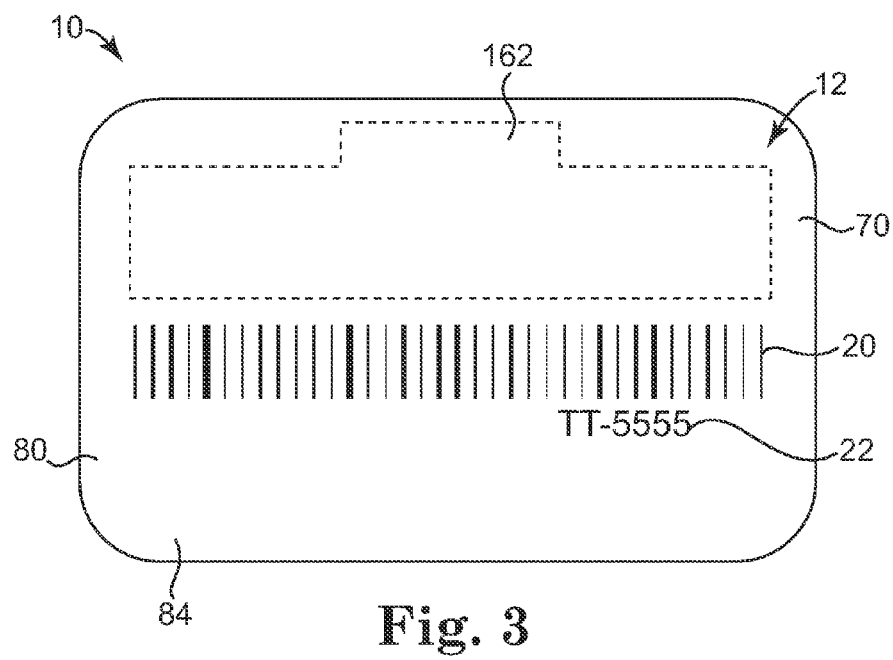
FIG. 3 is a rear view illustration of the transaction product of FIG. 1, according to one embodiment of the present invention.
Figure 4:
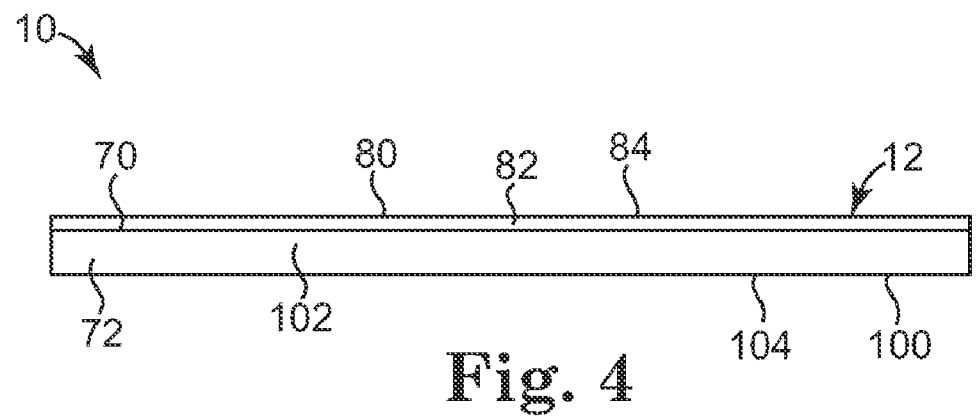
FIG. 4 is a top view illustration of the transaction product of FIG. 1, according to one embodiment of the present invention, wherein the bottom view is a mirror image thereof.
Figure 5:
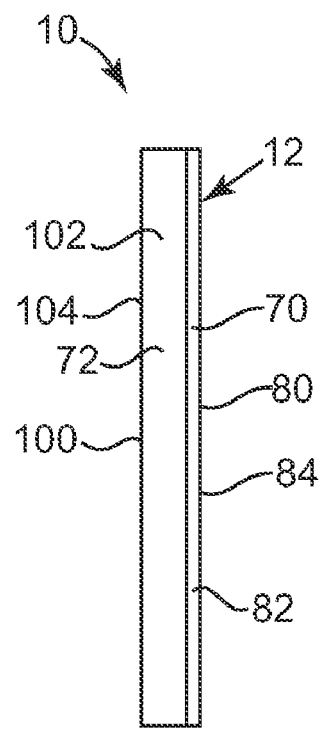
FIG. 5 is a right side view illustration of the transaction product of FIG. 1, according to one embodiment of the present invention, wherein the left side view is a mirror image thereof.

In one embodiment, redemption indicia 162, which are generally indicated with a dashed line box in FIG. 3, are included on transaction product 10, for example, on one or both of outside surface 84 of base 70 and outside surface 104 of cover 72. Redemption indicia 162 indicate that transaction product 10 is redeemable for the purchase of goods and/or services and that, upon use, a value of the purchased goods and/or services will be deducted from the financial account or record linked to transaction product 10. In one embodiment, redemption indicia 162 include phrases such as "<NAME OF STORE> GiftCard" and "This GiftCard is redeemable for merchandise or services at any of our stores or at our web site," and/or provides help or phone line information in case of a lost, stolen or damaged stored-value card, etc. In one embodiment, in which housing 12 is formed by injection molding, account identifier 20, redemption indicia 162 and one or more of any other indicia or information on transaction product 10 are printed onto outside surface 84 or outside surface 104 of housing 12.

Referring once again to FIGS. 1 and 6, a face panel 160 is optionally coupled to housing 12, for example to outside surface 104 of cover 72 within panel indentation 156. In one embodiment, face panel 160 is generally planar and is formed of paper, plastic or other suitable material. In one embodiment, face panel 160 is sized to fit within panel indentation 156 of cover 72. With this in mind, face panel 160 includes a first, outer surface 170 and a second, inner surface 172. First, outer surface 170 includes indicia such as meter indicia 174, decorative indicia 176, brand indicia 178 and button indicators 180. Second, inner surface 172 of face panel 160 is configured to interface with cover 72 within panel indentation 156. In one embodiment, face panel 160 is adhered to cover 72 with any suitable adhesive. In one embodiment, face panel 160 is formed on an adhesive backed plastic, paper, cardstock, etc. and is directly applied and adhered to cover 72.

Figure 2:
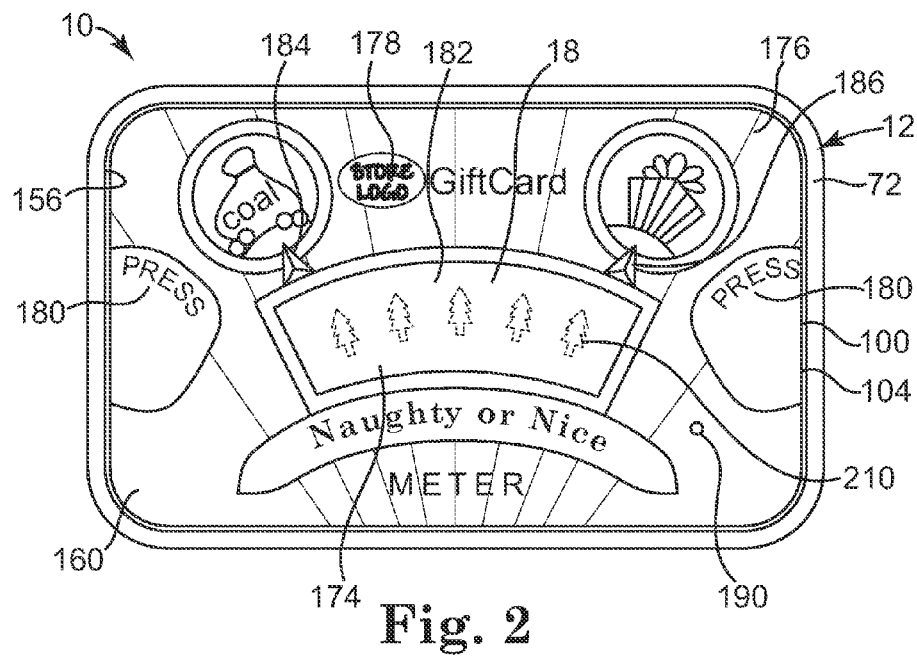
FIG. 2 is a front view illustration of the transaction product of FIG. 1, according to one embodiment of the present invention.

Referring, for example, to FIG. 2, meter indicia 174 depict a field 182, a first limit indicator 184 and a second limit indicator 186. Field 182 generally indicates a range of available values or statuses for which meter 18 may indicate a value. First limit indicator 184 is positioned near a first end of field 182 and generally indicates the value or status associated with a meter reading near the first end of field 182. Second limit indicator 186 is positioned near a second end of field 182 opposite the first end of field 182 and generally indicates a value or status associated with a meter reading near the second end of field 82. For example, as illustrated, first limit indicator 184 may indicate that a reading of meter 18 near the first end thereof indicates that the bearer of transaction product 10 is naughty, and second limit indicator 186 may indicate that a reading of meter 18 near the second end thereof indicates that the bearer of transaction product 10 is nice. Other values of first limit indicator 184, second limit indicator 186 and of field 182 will be apparent to those of skill in the art upon reading this application.

In one embodiment, face panel 160 is configured to be coupled with cover 72 such that field 182 extends over each light emission aperture 132 defined by cover 72 such that each light emission aperture 132 is spaced along field 182. In this manner, each light emission aperture 132 corresponds with a different status, value or other reading along the range of values represented by field 182. At least field 182 of face panel 160 is formed of a sufficient thickness and opaqueness to hide light emission apertures 132 from a users view, when lights 54 are not illuminated (i.e., periods of non-illumination), but is sufficiently thin or translucent to allow viewing of light emitted through each light emission apertures 132 when one or more of lights 54 are illuminated as generally indicated by the dashed lines 210 in FIGS. 1 and 2. In this manner, lighting of a light 54 provides a lighted representation in the shape of one of light emission apertures 132 that is viewable through face panel 160. In one embodiment, the lighted representation indicates a status, value or other measurement along field 182 of meter 18.

In one embodiment, decorative indicia 176 relate to a particular occasion, such as a wedding, new baby, graduation, holiday, season, brand identifier, media format identifier or other visual design to promote purchase of transaction product 10. Decorative indicia 176 may relate to the type of meter 18 depicted by meter indicia 174. Brand indicia 178 identify a brand associated with transaction product 10 such as identifying a product brand, a store brand, department, etc.

Button indicators 180 are each positioned on face panel 160 to generally align with one of buttons 16 upon assembly of transaction product 10. In this respect, each button indicator 166 corresponds with a location of transaction product 10 where the bearer, e.g., a customer or recipient, can interact with transaction product 10 to activate the non-transactional features of transaction product 10, in this case, electrical circuit 14. In one example, face panel 160 covers buttons 16 upon assembly of transaction product 10, and button indicators 180 not only indicate where a bearer of transaction product 10 should press transaction product 10 to interact with the corresponding buttons 16, but may also instruct the bearer to interact with buttons 16 by including text or other indications such as "press," "move," "switch" or something similar thereto as will be apparent to those of skill in the art upon reading this application.

Button indicators 180 are examples of means for informing a user of how to initiate non-transactional use of transaction product 10, as will be further described below. Other combinations or selections of indicia to be displayed on face panel 160 are also contemplated. In an alternate embodiment, at least portions of indicia described to be included on face panel 160 are directly printed to outside surface 104 of cover 72 or to outside surface 84 of base 70 or vice versa. In one embodiment, first, outer surface 170 of face panel 160 is printed and finished in any one of a variety of manners such as dull, matte, gloss, textured or other effect finish.

In addition, in one embodiment, face panel 160 includes one or more apertures 190 extending through face panel 160. Each of the one or more apertures 190 is configured to generally align with a different one of speaker apertures 154 defined by cover 72. In this respect, sound coming from speaker 52 has a clear pathway through speaker apertures 154 of cover 72 and the one or more apertures 190 of face panel 160. Other combinations or selections of information or indicia to be displayed on face panel 160 are also contemplated.

Figure 8:
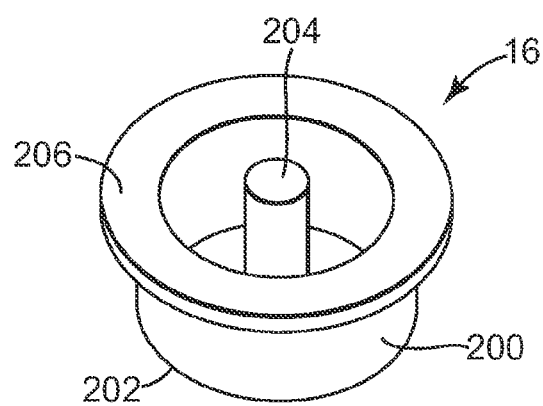
FIG. 8 is a perspective view illustration of a button of a transaction product, according to one embodiment of the present invention.

FIG. 8 illustrates a perspective view of one embodiment of one button 16 of transaction product 10. In one example, button 16 generally includes a relatively short hollow cylinder 200, an end wall 202 and a pin 204. End wall 202 extends across one end of hollow cylinder 200. Pin 204 extends from end wall 202 through the center of cylinder 200. In one embodiment, pin 204 extends from end wall 202 a distance further than cylinder 200 extends from end wall 202. Pin 204 is relatively rigid. A ring or rim 206 extends about the perimeter of cylinder 200 on an end opposite end wall 202. More particularly, rim 206 extends radially outwardly from cylinder 200 and, therefore, has a larger diameter than cylinder 200. Cylinder 200 is sized with a diameter sufficient to fit within button aperture 120. Conversely, rim 206 has a diameter greater than the overall diameter of button aperture 120 and raised rim 152 of cover 72.

As illustrated with reference to FIGS. 6 and 8, during assembly, each button 16 is placed within a corresponding button aperture 120 such that cylinder 200 of each button 16 fits within rim 152 of the corresponding button aperture 120, and rim 206 of button 16 interfaces with and extends over rim 152 of button aperture 120, thereby coupling button 16 to cover 72. In this respect, rim 206 of button 16 prevents button 16 from falling through button aperture 120 toward the outside of cover 72 (e.g., from inside surface 106 through primary panel 100 past outside surface 104).

Figure 9:
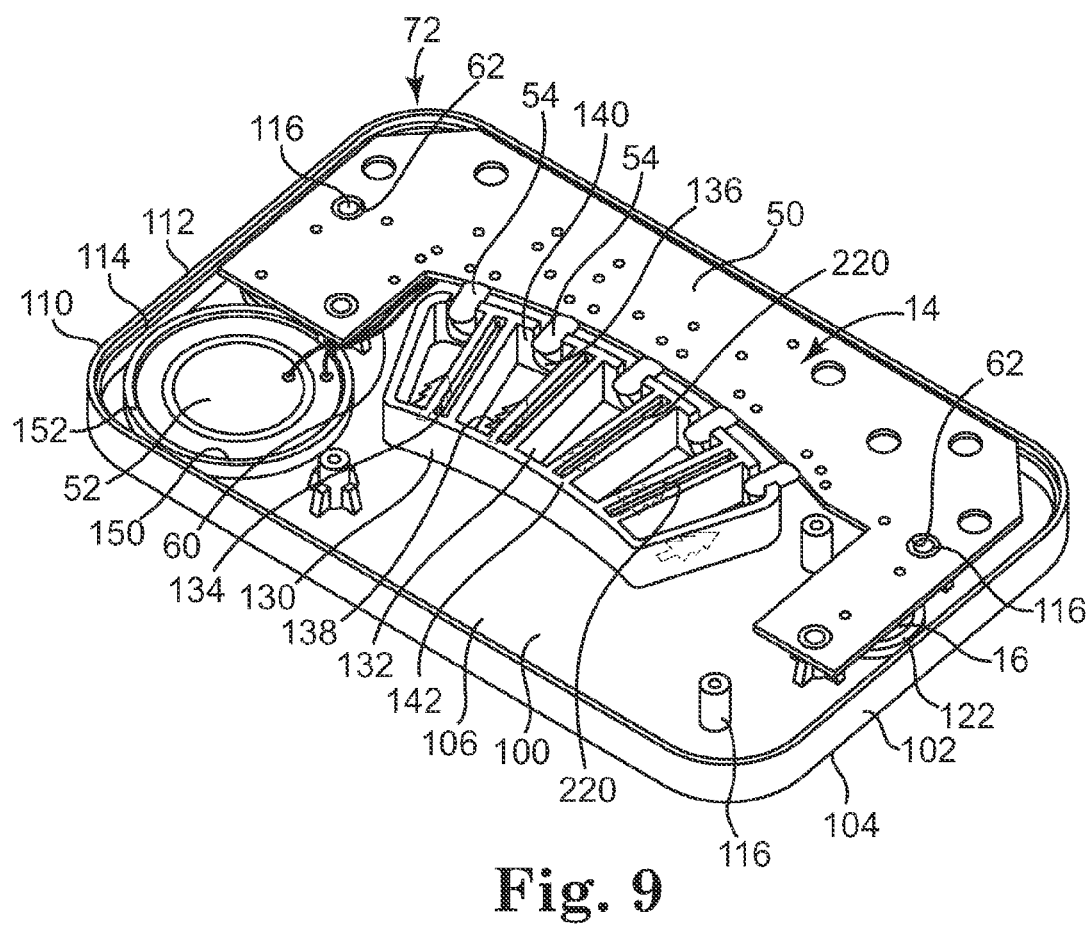
FIG. 9 is an inside perspective view illustration of the cover of FIG. 7 with an electrical circuit and light blocking panels, according to one embodiment of the present invention.

Once buttons 16 are each positioned within their respective button aperture 120, electrical circuit 14 is coupled to cover 72 as illustrated with primary reference to FIGS. 6 and 9. In particular, in one embodiment, PCB 50 of electrical circuit 14 includes features such as apertures 62 sized and positioned to each receive one of protrusions 116 of cover 72. PCB 50 may additionally or alternatively be adhered or otherwise coupled to cover 72. More specifically, in one embodiment, PCB 50 is positioned relative to cover 72 to align each activation switch 58 mounted thereon with one of buttons 16 such that activation of one of buttons 16 (i.e., movement of one of buttons 16 further into housing 12) causes the respective button 16, more specifically, pin 204 of button 16, to interact with the corresponding activation switch 58 of electrical circuit 14. Interaction between button 16 and activation switch 58 activates electrical circuit 14 to perform a desired function (e.g., to provide a variable light presentation and/or to emit an audio signal). As such, button 16 is one example of means for initiating selective illumination of each of lights 54 to indicate a meter reading.

Speaker 52 is positioned within speaker reception area 150 of cover 72. In particular, speaker 52 fits within rim 152 such that a front of speaker 52 is placed adjacent inside surface 106 of primary panel 100 of cover 72. As such, speaker 52 is also aligned with and positioned adjacent to speaker aperture(s) 154. Speaker 52 may additionally be adhered or otherwise coupled with cover 72 (e.g., with inside surface 106 and/or rim 152) and/or base 70. In other embodiments, electrical circuit 14 is at least partially positioned with respect to and/or coupled to base 70 rather than or in addition to cover 72. Each of lights 54 is placed to extend into a corresponding or different one of the plurality of light cavities 132 via a corresponding light reception aperture 136. In one example, each light 54 is fully positioned within a different one of the plurality of light cavities 132. In one embodiment, where blocking cavities 134 are each positioned between a different two of the plurality of light cavities 132, a blocking panel 220 is positioned within each blocking cavity 134. Each blocking panels 220 is configured to facilitate blocking light from passing side-to-side from one light cavity 132 to another thereby preventing or at least decreasing light from one light 54 migrating to partially illuminate a light cavity 132 associated with a different one of the lights 54. In other words, blocking panels 220 are configured to direct emission of illumination from the plurality of light cavities 132 to primarily occur through corresponding ones of light emission apertures 138.

For example, wherein cover 72 is formed of a material that generally allows some light emission through surfaces thereof, blocking panels 220 are formed of paper, plastic or other suitable matter configured to block, absorb or at least decrease light that would otherwise pass therethrough.

Figure 10:
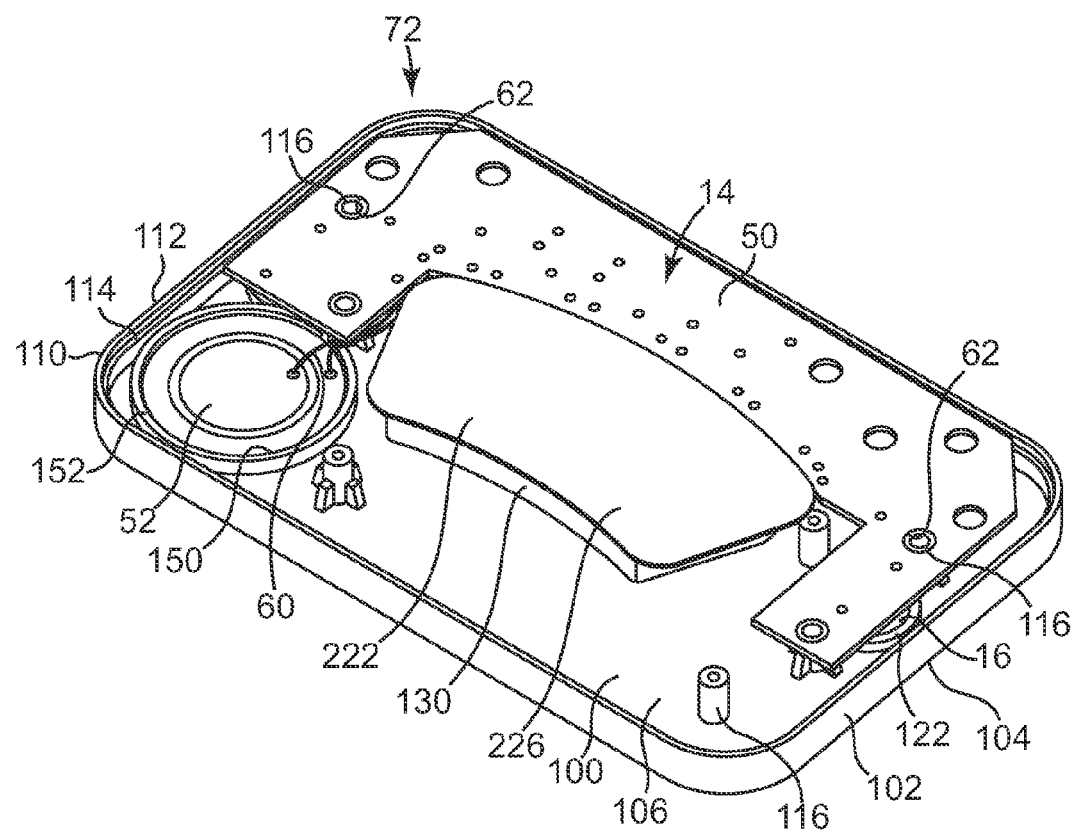
FIG. 10 is an inside perspective view illustration of the cover and the electrical circuit of FIG. 9 and with a light blocking mask, according to one embodiment of the present invention.

In one embodiment, to further decrease migration of light from each light 54 to an adjacent light cavity 232, a blocking mask 222 (e.g., larger than but similar to another blocking panel 220) is positioned and secured to edge 142 of internal walls 130 to cover each light cavity 132 and blocking cavities 134 as illustrated with additional reference to FIG. 10. In one example, blocking mask 222 includes adhesive on a first surface 224 thereof and is adhered to edge 142. As such, blocking mask 222, which is configured to absorb light and decrease the amount of light emitted therethrough, further contains light emitted from one of lights 54 and prevents or at least decreases the amount of light migrating from the corresponding light cavity 132, the amount of light invading one of the generally adjacent light cavities 132 that is associated with a different one of lights 54 and the amount of light being at least partially emitted through base 70. In one embodiment, a second surface 226 of blocking mask 222 opposite first surface 224 is printed with black ink or other blocking ink to facilitate the light blocking or absorption functionality of blocking mask 222.

Once electrical circuit 14 as well as blocking panels 220 and blocking mask 222, if any, are properly positioned, base 70 is placed upon cover 72 or vice versa. Accordingly, base 70 is placed on cover 72 such that inside edge 90 of base 70 interfaces with inside edge 110 of cover 72. More specifically, first portion 92 and second portion 94 of inside edge 90 interface with first portion 112 and second portion 114 of inside edge 110, respectively. The stepped interface provides for a stable and generally neat coupling of base 70 and cover 72. In one example, adhesive is applied between inside edge 90 and inside edge 110 to secure base 70 to cover 72 and/or cover 72 is ultrasonically welded or otherwise coupled with base 70 along inside edges 90 and 110. In one embodiment, upon coupling of base 70 with cover 72, cylindrical protrusions 96 (FIG. 6) of base 70 receive some of the plurality of protrusions 116 (FIGS. 7, 9 and 10) of cover 72. Other methods of securing base 70 to cover 72 are also contemplated.

Following securing of base 70 to cover 72, in one embodiment, second, inner surface 172 of face panel 160 is applied to outside surface 104 of cover 72. In particular, face panel 160 is fit and adhered within panel indentation 156 to generally align aperture(s) 190 of face panel 160 with the at least one speaker aperture 154 of cover 72. When aligned and placed on cover 72, button indicators 180 of face panel 160 each generally align with a corresponding button 16. In one embodiment, face panel 160 is also adhered to end wall 202 of each button 16. In other embodiments, face panel 160 is applied to cover 72 before assembling cover 72 with button 16, electrical circuit 14 and/or base 70.

Upon coupling of face panel 160 with cover 72, field 82 of meter 18 defined by face panel 160 is positioned to extend directly over light emission apertures 138 defined by cover 72. Face panel 160 is configured to hide light emission apertures 138 from view when corresponding light sources 54 are non-illuminated while allowing viewing of light emitted through individual ones of light emission apertures 138 when corresponding light sources 54 are illuminated as generally indicated at 210 with dashed lines in FIGS. 1 and 2.

Upon final assembly, transaction product 10 functions to both amuse consumers and/or recipients and to entice consumers to purchase transaction product 10. In particular, upon a consumer or recipient pressing face panel 160 in a position corresponding with one or more of button indicators 180, the corresponding button 16 is moved thereby interacting with activation switch 58 of electrical circuit 14. Interaction (e.g., pressing or otherwise moving) activation switch 58 activates the electrical circuit 14 to provide a first sequence or pattern of illumination that differs from other available sequences or patterns of illumination. In particular, additionally referring to FIG. 6, interaction with activation switch 58 closes electrical circuit 14, thereby drawing current from the at least one power source 56 to illuminate lights 54 and, in one example, to play audio signals via speaker 52.

In one example, electrical circuit 14 is configured to randomly illuminate different ones of lights 54 for a given time period for a relatively short period of time and to conclude with illumination of one of the end ones of lights 54 at an end of an array defined by lights 54 in a light sequence or pattern. In this manner, the random or otherwise variable illumination of different ones of lights 54 for a given time period for a relatively short period of time is provided to simulate that the depicted meter 18 is thinking or running tests to determine the proper meter reading associated with the current bearer of transaction product 10. The conclusion of the light sequence or pattern with prolonged illumination of one of the end ones of the array of lights 54 is provided to indicate the final simulated reading of meter 18, e.g., that the user is naughty (as indicated near first limit indicator 184), nice (as indicated near second limit indicator 186) or somewhere in between. User interaction with one of buttons 16 and thereby electrical circuit 14 illustrates one example of means for presenting a variable light pattern upon user demand. Accordingly, the customer and/or recipient are presented with both a stored-value card and a source of additional visible amusement.

In one embodiment, the overall visual presentation of a meter reading as described above is supplemented with corresponding audio signals. For example, during the first portion of the light sequence or pattern (i.e., while lights 54 are each illuminated for relatively short periods of time), the audio signal produces a sequence of short tones. During the conclusion of the light sequence or pattern, when one of lights 54 is illuminated for a relatively prolonged period of time, a tone is produced for a corresponding prolonged period of time. In one example, the specific tone produced for the prolonged period of time is dependent upon which one of lights 54 is being illuminated at the time. For example, where light 54 illuminated for the prolonged period of time corresponds with a meter reading generally thought to be undesirable (e.g., a naughty reading) the tone may be low in pitch so as to convey the disappointment associated with the reading. Conversely, where the one of lights 54 illuminated for the prolonged period of time corresponds with a meter reading generally thought to be desirable (e.g., a nice reading) the tone may be high in pitch so as to convey the bearer's happiness or amusement associated with the reading.

Figure 11:
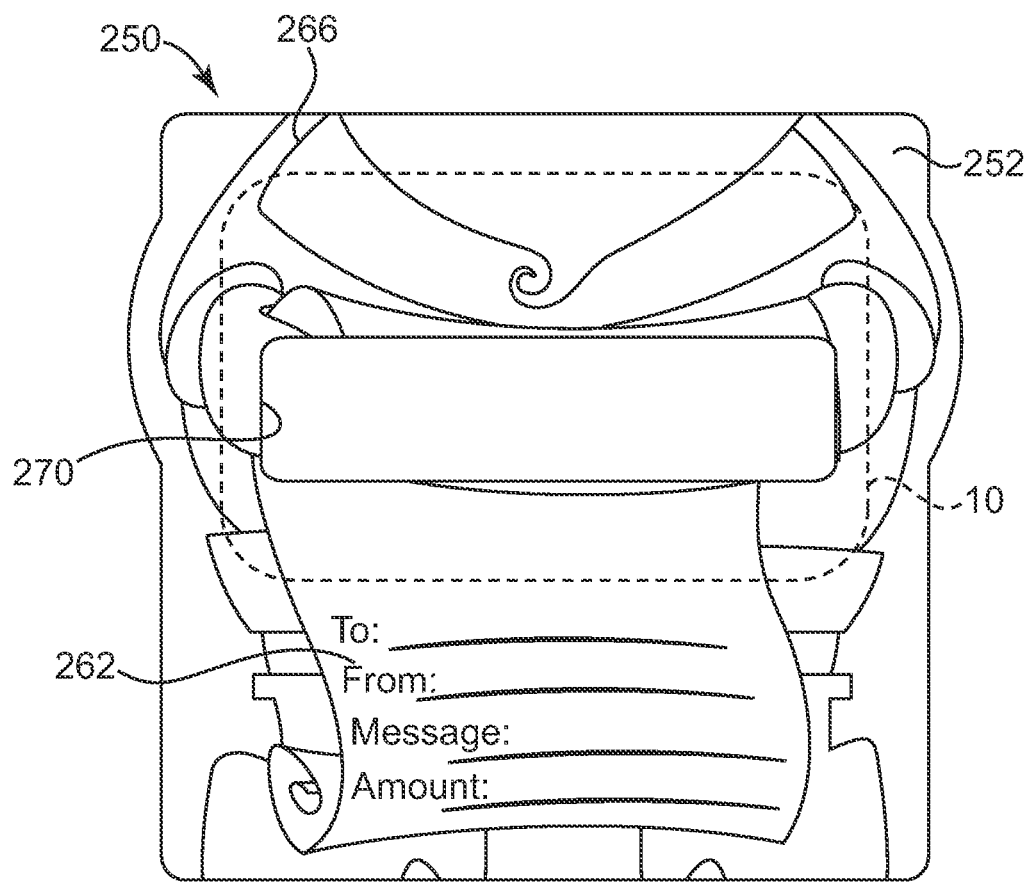
FIG. 11 is a front view illustration of a backer for a transaction product, according to one embodiment of the present invention.
Figure 12:
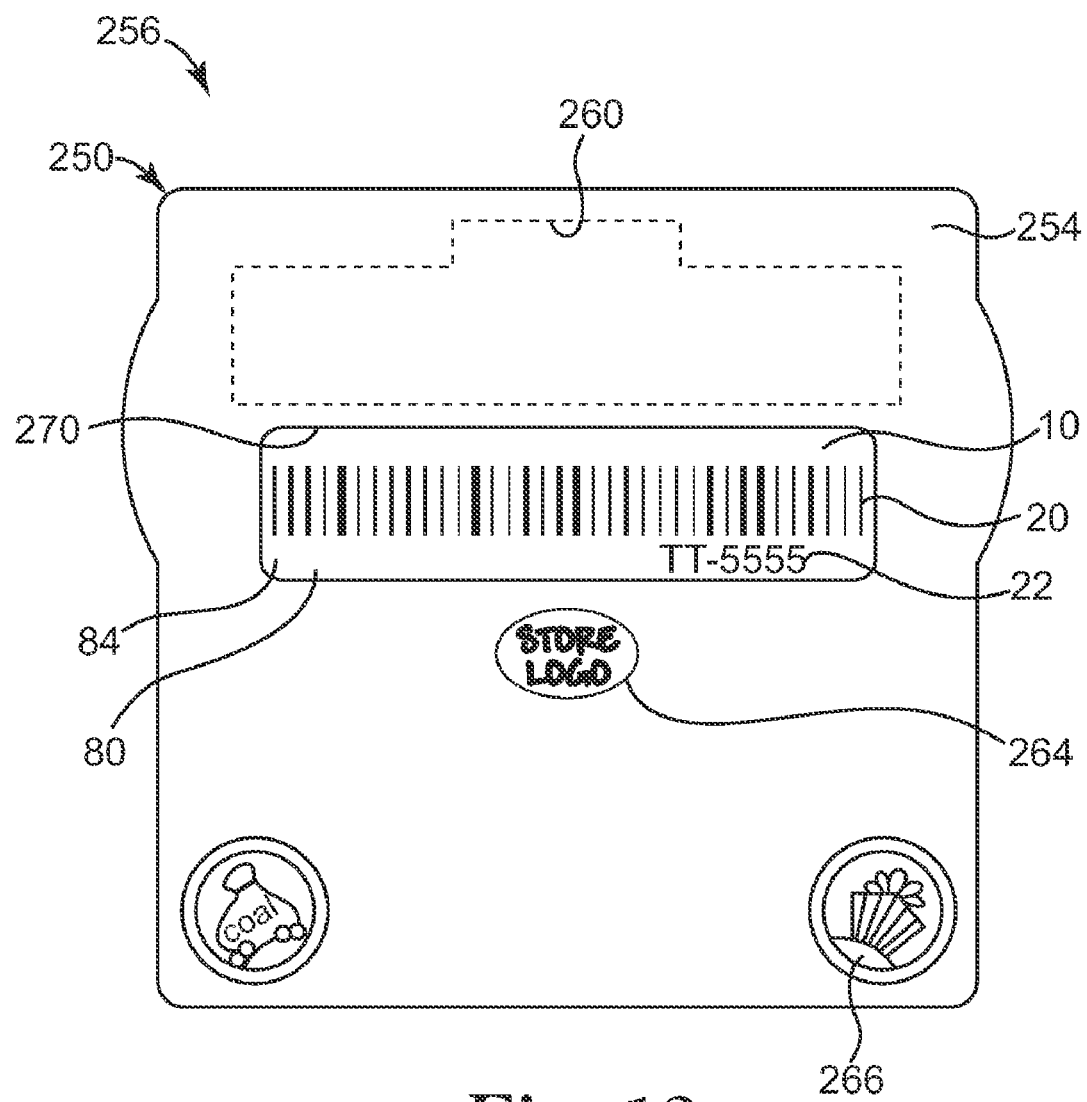
FIG. 12 is a rear view illustration of a transaction product assembly including the backer of FIG. 11 with the transaction product of FIG. 1, according to one embodiment of the present invention.

FIGS. 11 and 12 illustrate a carrier or backer 250 supporting transaction product 10 (FIGS. 1-6). Backer 250 comprises a single layer or multiple layers of paper or plastic material, for example, generally in the form of a relatively stiff but bendable/flexible card. Use of other materials is also contemplated. As such, backer 250 defines a first or front surface 252 (FIG. 11) and a second or rear surface 254 (FIG. 12). Transaction product 10, which is generally represented in phantom lines in FIG. 11 for illustrative purposes (e.g., to allow for full viewing of front surface 252), is readily releasably attached to backer 250, for example, by adhesive, blister packaging, overlying skinning material or the like, such that transaction product 10 with backer 250 collectively define a transaction product assembly 256.

Backer 250 displays indicia, graphics or text information including store logo(s), store name(s), slogans, advertising, instructions, directions, brand indicia, promotional information, holiday indicia, seasonal indicia, media format identifiers, characters and/or other information. The various indicia may be included on one or more of front and rear surfaces 252 and 254. In one example, the indicia include one or more of redemption indicia 260, message field indicia 262, brand indicia 264, decorative indicia 266, etc.

Redemption indicia 260, which are generally indicated with a dashed line box in FIG. 12, inform a bearer of transaction product assembly 256 that transaction product 10 is redeemable for the purchase of goods and/or services and that upon use, a value of the purchased goods and/or services will be deducted from the financial account or record linked to transaction product 10. In one embodiment, redemption indicia 260 include phrases such as "<NAME OF STORE> Gift-Card" and "This GiftCard is redeemable for merchandise or services at any of our stores or at our website," and/or provides help or phone line information in case of a lost, stolen or damaged transaction product 10, etc.

Message field indicia 262, for example, include "to," "from" and "amount" fields and are configured to be written to by the bearer of transaction product assembly 256 prior to presenting transaction product assembly 256 to a recipient. As such, message field indicia 262 facilitate the consumer in preparing transaction product assembly 256 for gifting to a recipient.

Brand indicia 264 identify a store, brand, department, etc. and/or services associated with transaction product 10. Any decorative indicia 266, which may be similar to or coordinate with indicia of transaction product 10, may also be included on backer 250. Any of indicia 260, 262, 264, 266 or other indicia optionally may appear anywhere on backer 250 or transaction product 10. In one embodiment, at least one of indicia 260, 262, 264, 266 or other indicia include stylized text further contributing to the aesthetics of transaction product assembly 256 as illustrated, for example, in FIGS. 11 and 12. Additional information besides that specifically described and illustrated herein may also be included.

In one embodiment, backer 250 includes a window or opening 270 for displaying account identifier 20 of transaction product 10 as illustrated in FIG. 12. As previously described, account identifier 20 is adapted for accessing an account or record associated with transaction product 10 for activating, loading or debiting value from the account or record. Accordingly, in one embodiment, opening 270 allows access to account identifier 20 to activate and/or load transaction product 10 without removing transaction product 10 from backer 250.

According to one embodiment, FIG. 12 illustrates surfaces of backer 250 that will be supported on a rack or other fixture while FIG. 11 illustrates surfaces of backer 250 that will be visible to a consumer of a retail store who is considering the purchase of transaction product assembly 256. Other backers, such as foldable backers (not shown), can be used with various sizes and shapes of transaction products 10.

Figure 13:
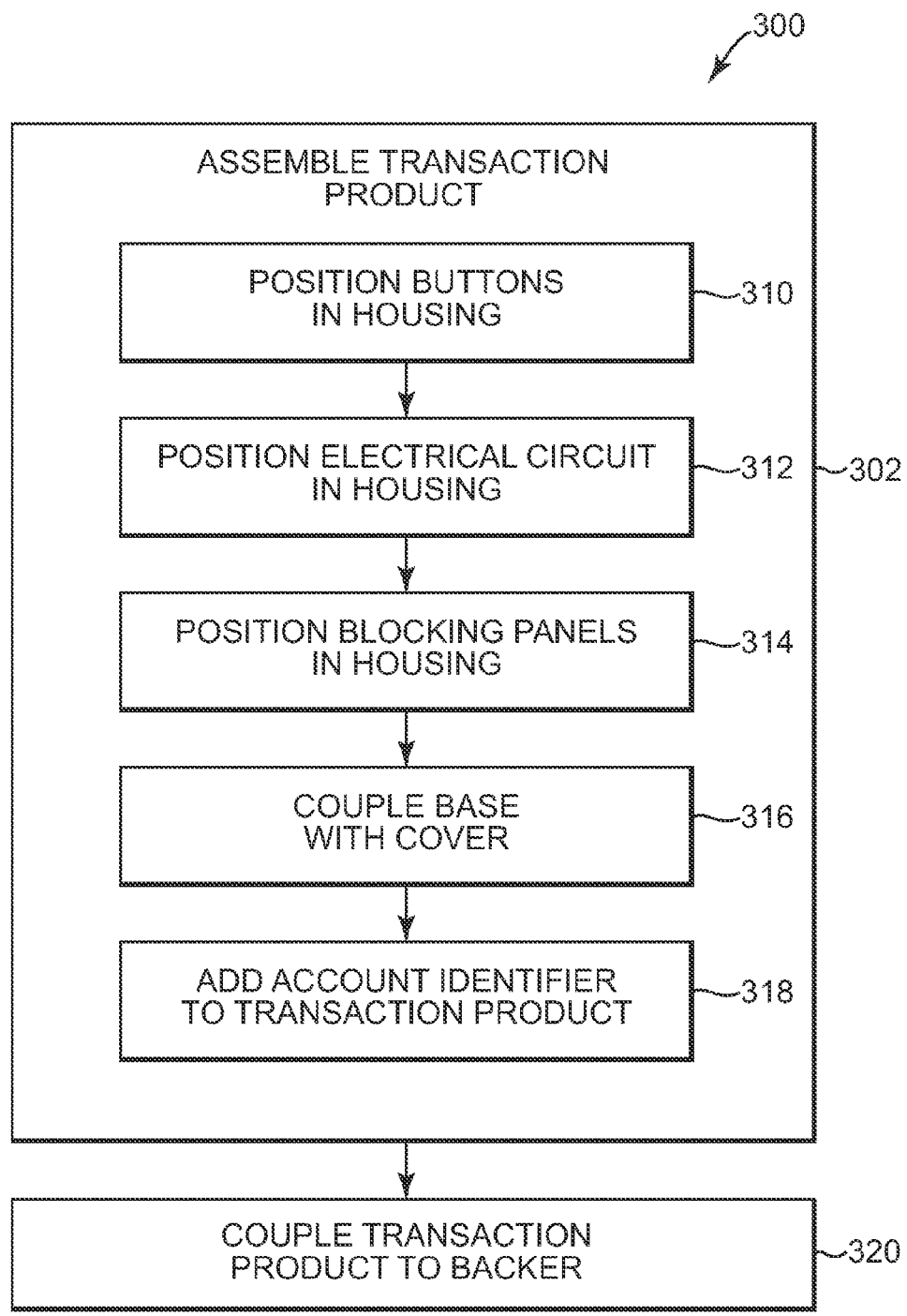
FIG. 13 is a flow chart illustrating a method of assembling the transaction product of FIG. 1, according to one embodiment of the present invention.

FIG. 13 is a flow chart illustrating one embodiment of a method 300 of assembling transaction product 10. For example, at 310, buttons 16 are placed relative to housing 12, for example, to at least partially be seated within button apertures 120 of cover 72. At 312, electrical circuit 14 is positioned in housing 12 as described above. For instance, electrical circuit 14 is coupled with cover 72 such that activation switches 58 each align with one of buttons 16 such that subsequent user interaction with one of buttons 16 will cause interaction with one of the corresponding activation switches 58 and activate electrical circuit 14. Furthermore, upon positioning of electrical circuit 14 relative to cover 72, a different one or more of lights 54 of electrical circuit 14 are positioned to extend into each one of light cavities 132 as described above.

At 314, blocking panels 220, if any, are positioned in blocking cavities 134 (i.e., between otherwise adjacent light cavities 132) as described above. In addition or in the alternative, blocking mask 222 is secured to edge 142 of internal walls 130 to cover each of the plurality of light cavities 132 and to limit emission of light from light cavities primarily to the corresponding light emission apertures 138.

Once buttons 16, electrical circuit 14 and any blocking panels 220 and/or blocking mask 222 are in place, base 70 and cover 72 are coupled to one another at 316. In one instance, inside edge 90 of base 70 is positioned to abut and be secured to inside edge 110 of cover 72 as described above. Other methods of coupling base 70 and cover 72 are also contemplated as are alternative housings 12 or support members that may not include base 70 and/or cover 72. In one embodiment, face panel 160 is already applied to cover 72 in a manner similar to that described above prior to coupling cover 72 with base 70, while in other embodiments, face panel 160 is not applied to cover 72 until housing 12 is fully assembled (i.e., base 70 is coupled with cover 72).

At 318, account identifier 20 is added to housing 12, if account identifier is not already part of transaction product 10. Although pictured in FIG. 13 as occurring after all of operations 310, 312, 314 and 316, it should be understood that account identifier 20 may be applied to housing 12 or any portion thereof at any suitable time during manufacturing and assembly thereof. For example, account identifier 20 may be molded into or otherwise integrally formed as part of housing 12, may be enclosed within housing 12 and/or may be printed or otherwise applied to housing 12 before or after one or more of operations 310, 312, 314 and 316 as will be apparent to those of skill in the art upon reading this application.

At 320, transaction product 10 is coupled with backer 250 as generally illustrated with additional reference to FIGS. 11 and 12 to form transaction product assembly 256. Transaction product 10 may be adhered, skinned to, blister packed with or otherwise suitably coupled with backer 250. In one embodiment, account identifier 20 of transaction product 10 is accessible for scanning while transaction product 10 is coupled with backer 250, for example, through opening 270 in backer 250.

Figure 14:
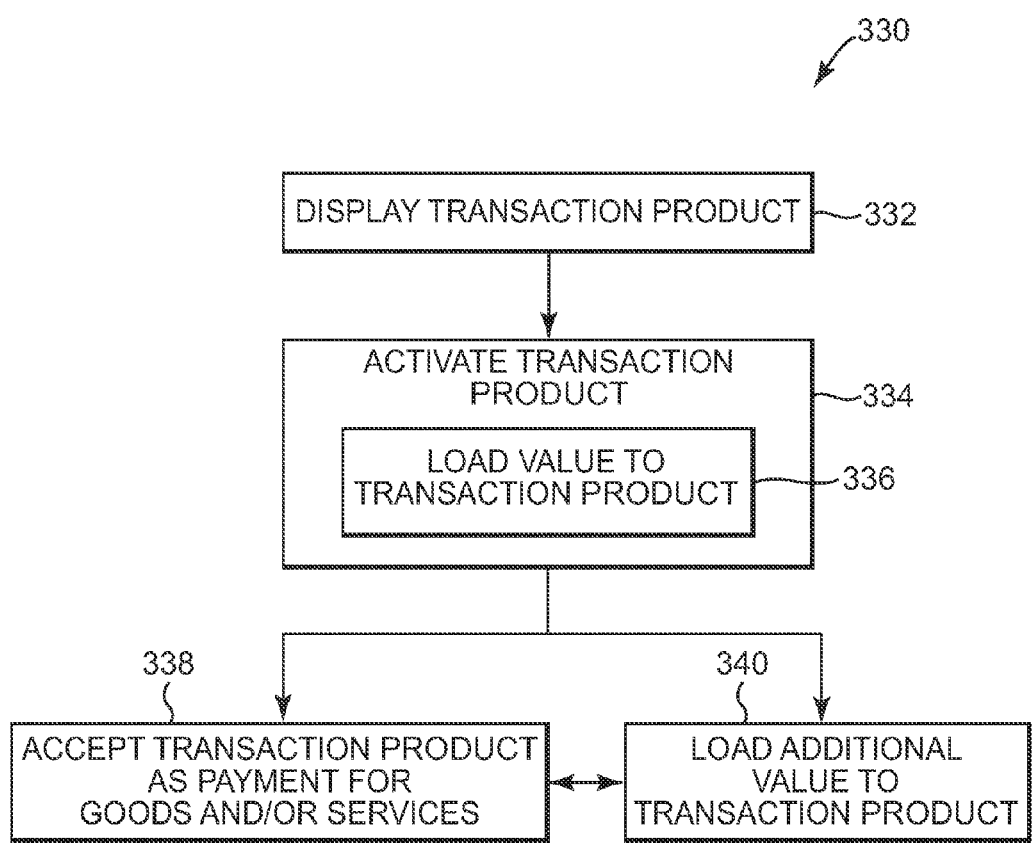
FIG. 14 is a flow chart illustrating a method of encouraging purchase and facilitating use of a transaction product, according to one embodiment of the present invention.

FIG. 14 is a flow chart illustrating one embodiment of a method 330 of encouraging purchase and facilitating use of transaction product 10 by consumers and/or recipients. At 332, transaction product 10 is placed on or hung from a rack, shelf or other similar device to display transaction product 10 for sale to potential consumers. In one embodiment, a depiction of transaction product 10 is placed on a web site for viewing and purchase by potential consumers. In one example, display of transaction product 10 includes advertising the simulated meter or measurement features of transaction product 10 to encourage consumer purchase of transaction product 10, for example, in the form of indicia 260, 262, 264, 266, etc.

At 334, a consumer who has decided to purchase transaction product 10 presents transaction product 10 on backer 250 to a retail store employee, retail store kiosk, remote terminal or other person or device to scan account identifier 20 to access an account or record linked to account identifier 20. In particular, account identifier 20 is scanned or otherwise accessed, for example through opening 270 of backer 250 to activate transaction product 10. Upon accessing the account or record, then, at 336, value is added to the account or record in the form of monetary value, points, minutes, etc. Thus, transaction product 10 is activated and loaded.

In one example, a predetermined value is associated with transaction product 10 (i.e., associated with the account or record linked to transaction product 10 via account identifier 20) prior to activation and display, but such predetermined value is not initially available for use toward the purchase or use of goods and/or services. In such an embodiment, at 334, transaction product 10 is activated to permit subsequent access to the predetermined value (e.g., subsequent loading on and debiting from the account or record) and no additional value is added during activation such that operation 336 may be eliminated.

Once transaction product 10 is activated and loaded, transaction product 10 can be used by the consumer or any other bearer of transaction product 10 to purchase goods and/or services at the affiliated retail setting (e.g., a retail store or web site) or can be used in exchange for calling minutes, etc. In one embodiment, where transaction product 10 is displayed on a web site at 332, then, at 334, transaction product 10 may be activated in any suitable method and may not require the physical scanning of account identifier 20 to be activated or to otherwise access the associated account or record such as at 336.

In one example, at 338, the retail store or other affiliated retail setting or web site accepts transaction product 10 as payment towards the purchase of goods and/or services made by the current bearer of transaction product 10. In particular, the value currently loaded on transaction product 10 (i.e., stored or recorded in the account or record linked to account identifier 20) is applied toward the purchase of goods and/or services. At 340, additional value is optionally loaded on transaction product 10 at a point-of-sale terminal, kiosk or other area of the retail store, retail web site, or other related setting. Upon accepting transaction product 10 as payment at 338, the retail store or related setting can subsequently perform either operation 338 again or operation 340 as requested by a current bearer of transaction product 10. Similarly, upon loading additional value on transaction product 10 at 340, the retail store or related setting can subsequently perform either operation 340 again or operation 338. In one example, the ability to accept transaction product 10 as payment for goods and/or services is limited by whether the account or record associated with transaction product 10 has any value stored or recorded therein at the time of attempted redemption.

Figure 15:
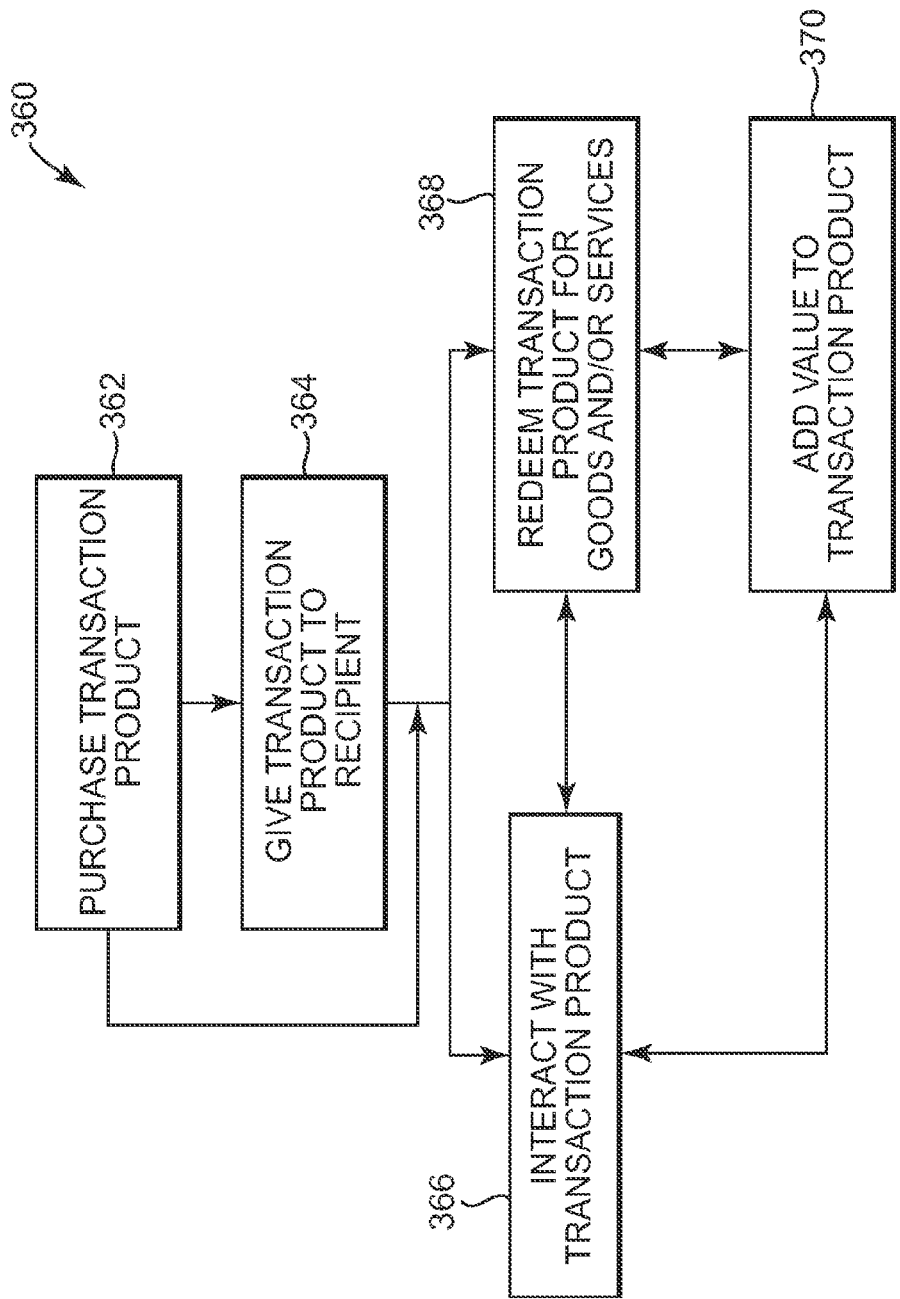
FIG. 15 is a flow chart illustrating a method of using a transaction product, according to one embodiment of the present invention.

FIG. 15 is a flow chart illustrating one embodiment of a method 360 of using transaction product 10 (e.g., FIGS. 1-6). At 362, a potential consumer of transaction product 10, which is displayed in a retail store or viewed on a web site, decides to and does purchase transaction product 10 from the retail store or web site. It should be understood that transaction product 10 can be displayed and purchased alone or as part of transaction product assembly 256 (FIG. 12) along with backer 250.

Upon purchasing transaction product 10, a retail store employee, a retail store kiosk or other person or device scans account identifier 20 (FIG. 3), for example, through opening 270 of backer 250 or otherwise reads or accesses account identifier 20. Upon accessing account identifier 20, the account or record linked to account identifier 20 is accessed and activated to load value onto transaction product 10 (i.e., load value to the account or record associated with transaction product 10). In one embodiment, such as where transaction product 10 is purchased at 362 via a web site, actual scanning or other mechanical detection of account identifier 20 may be eliminated and/or manual input of code 22 may be added.

At 364, the consumer optionally gives transaction product 10 to a recipient, such as a graduate, relative, friend, expectant parents, one having a recent or impending birthday, a couple having a recent or impending anniversary, etc. In one embodiment, a plurality of transaction products 10 are purchased and given to party goers, such as at a birthday party, etc. as party favors or gifts. As an alternative, the consumer can keep transaction product 10 for his or her own use thereby eliminating operation 364.

At 366, the consumer, recipient or other current bearer of transaction product 10 interacts with transaction product 10. In one embodiment, playing or otherwise interacting with transaction product 10 at 366 includes interacting with buttons 16, which may be completed through face panel 160, to activate transaction product 10 to simulate taking a reading or measurement from the bearer and indicating the simulated reading to the bearer. For example, the reading or measurement is simulated by presenting a random or otherwise variable illumination for relatively short periods of time of individual ones of lights 54 followed by a simulated final reading illuminating one of lights 54 for an extended period. The process of simulating measurement and a final reading of meter 18 to bearer of transaction product 10 serves to amuse both the bearer and any other observers of transaction product 10. In one embodiment, repeated performance of operation 368 causes a different light sequence or pattern to be presented such the simulated meter readings differ from use to use. In one embodiment, such interaction with transaction product 10 is supplemented with the output of audio signals from electrical circuit 14 as described above. In view of the above, electrical circuit 14 provides one example of means for selectively illuminating each of lights 54 and, in combination with meter indicia 174, provides one example of means for depicting a simulated meter reading.

At 368, the consumer or recipient redeems transaction product 10 for goods and/or services from the retail store or web site. At 370, the consumer or recipient of transaction product 10 optionally adds value to transaction product 10, more particularly, to the account or record associated with account identifier 20 included therewith, at the retail store or over the Internet (i.e., via the web site). Upon playing with transaction product 10 at 366, redeeming transaction product 10 at 368 or adding value to transaction product 10 at 370, the consumer or recipient of transaction product 10 subsequently can perform either of operations 366, 368 or 370 as desired. In one embodiment, the ability of the consumer or recipient to repeat redeeming transaction product 10 at 370 is limited by whether the account or record linked with transaction product 10 has any remaining value stored or recorded therein at the time of attempted redemption.

Although primarily described above as occurring at a single retail store or web site, in one embodiment, purchasing transaction product 10 at 362, redeeming transaction product 10 at 368 and adding value to transaction product 10 at 370, can each be performed at any one of a number of stores adapted to accept transaction product 10 or over the Internet. In one example, each of the number of stores is part of a chain or a group of similarly branded stores. In one example, a number of stores include at least one web site and/or at least one conventional brick and mortar store.

Figure 16:
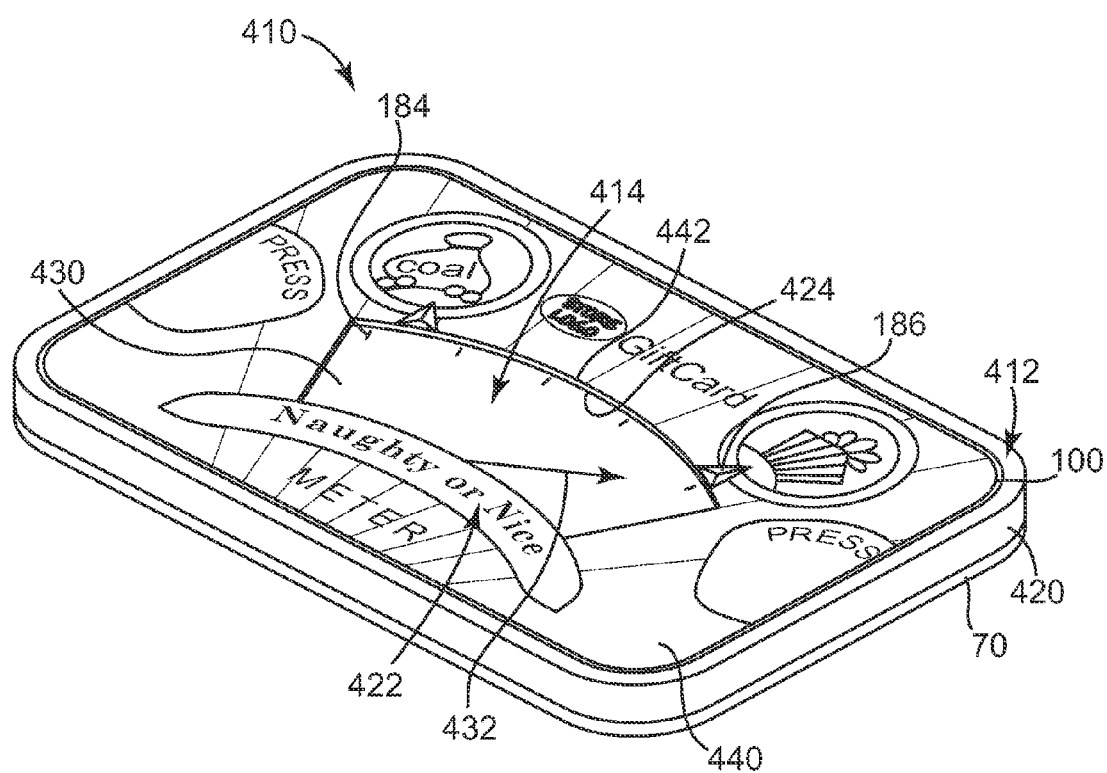
FIG. 16 is a perspective view illustration of a transaction product, according to one embodiment of the present invention.

FIG. 16 illustrates one embodiment of a transaction product 410 according to one embodiment of the present invention. Transaction product 410 is substantially similar to transaction product 10 (FIGS. 1-6) as described above except where specifically enumerated herein. Transaction product 410 includes a housing 412 and an electrical circuit 414.

Housing 412 includes base 70 and a cover 420, which is substantially similar to cover 72. Cover 420, or other portions of transaction product 410, generally depicts at least a portion of meter 422 and defines a meter aperture 424 extending through primary panel 100 of cover 420. In one embodiment, meter aperture 424 is sized similar to meter field 182 of transaction product 10 (e.g., FIG. 2). Electrical circuit 414 is substantially similar to electrical circuit 14, however, lights 54 (e.g., FIG. 6) are replaced with a liquid crystal display (LCD) screen 430, which aligns with and is viewable through meter aperture 424 such that LCD screen 430 provides a meter field.

Upon activation of electrical circuit 414, which is initiated similar to activation of electrical circuit 14, LCD screen 430 presents a variable reading to the bearer of transaction product 410 to simulate a meter measurement or reading. For example, LCD screen 430 depicts an arrow, needle or other meter indicator 432, which randomly moves along, across through or otherwise on the meter field, eventually stopping at a position along the meter field to indicate a final simulated reading (e.g., stops near first limit indicator 184 or second limit indicator 186 of cover 420 or a face panel 440, which is similar to face panel 160 (e.g., FIG. 6) applied thereto). In one example, where face panel 440 is included, face panel 440 defines an aperture 442 positioned to align with meter aperture 424 such that LCD screen 430 can be viewed through cover 420 and face panel 440 generally without obstruction. Other variations within the scope of the present invention will be apparent to those of skill in the art upon reading the present application.

Transaction products come in many forms, according to embodiments of the invention. The gift card, like other transaction products, can be "re-charged" or "re-loaded" at the direction of the original consumer, the gift recipient or a third party. The term "loading on" or "loaded on" herein should be interpreted to include adding to the balance of an account or record associated with a transaction product. The balance associated with the transaction product declines as the transaction product is used, encouraging repeat visits or use. The transaction product remains in the user's purse or wallet, serving as an advertisement or a reminder to revisit the associated merchant. Gift cards according to embodiments of the invention provide a number of advantages to both the consumer and the merchant. Other transaction products according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are for illustrative purposes only and should not be considered to limit the invention. Various alternatives and other modifications within the scope of the invention in its various embodiments will be apparent to those of ordinary skill. For example, while primarily described herein as providing a simulated meter or measurement device, in one example, a transaction product may be provided including an actual meter or measurement device.

What is claimed is:

1. A transaction product, comprising:
   a support member at least partially depicting a measurement device;
   an electrical circuit coupled to the support member;
   a button in communication with the electrical circuit such that user interaction with the button activates the electrical circuit, which causes the electrical circuit to automatically indicate a reading of the measurement device; and
   a machine readable account identifier linking the transaction product to an account;
   wherein:
      the measurement device is a simulated measurement device including a meter having a first limit and a second limit spaced apart from and positioned on an end of the meter opposite the first limit,
      the measurement device simulates measurement of a user characteristic of the user,
      upon user interaction with the button, the electrical circuit automatically and randomly indicates a position on the meter corresponding with the user characteristic, the position on the meter being one of at the first limit, at the second limit, and between the first limit and the second limit,
      the meter comprises a first graphic image adjacent the first limit and a second graphic image adjacent the second limit,
      the first graphic image has a connotation in agreement with the first limit, and
      the second graphical image has a connotation in agreement with the second limit.

2. The transaction product of claim 1, wherein the account identifier is a bar code connected to the support member.

3. The transaction product of claim 1, wherein the account identifier includes at least one of a bar code, a magnetic strip, a smart chip and a radio frequency identification (RFID) device.

4. The transaction product of claim 1, wherein the electrical circuit includes a plurality of lights arranged in a single row array, wherein each of the plurality of lights corresponds with a different available reading of the measurement device.

5. The transaction product of claim 4, wherein the electrical circuit is configured to indicate the reading of the measurement device by illuminating one of the plurality of lights.

6. The transaction product of claim 4, wherein the support member is part of a housing substantially enclosing the electrical circuit.

7. The transaction product of claim 6, wherein the housing defines a plurality of light cavities separated from one another and substantially enclosed within the housing, each of the plurality of lights being positioned in a different one of the plurality of light cavities.

8. The transaction product of claim 7, wherein a different one of a plurality of light emission apertures is formed within each of the plurality of light cavities, such that when one of the plurality of lights is illuminated, illumination is emitted from a corresponding one of the plurality of light cavities in a shape of a corresponding one of the light emission apertures.

9. The transaction product of claim 8, further comprising blocking panels formed separately from and received by the housing, wherein the blocking panels are configured to absorb illumination from the plurality of lights in a manner directing emission of illumination from the plurality of light cavities to primarily occur through the corresponding ones of the light emission apertures.

10. The transaction product of claim 4, wherein the electrical circuit includes a speaker and is configured to emit an audio signal from the speaker, the audio signal including individual audio tones emitted for lengths of time that are proportionate to lengths of time that individual ones of the plurality of lights are illuminated.

11. The transaction product of claim 7, wherein each of the plurality of light cavities is spaced from others of the plurality of light cavities by a blocking cavity, and wherein the blocking cavity is characterized by an absence of one of the plurality of lights.

12. The transaction product of claim 1, wherein the electrical circuit includes a speaker, and wherein the speaker is configured to emit an audio signal corresponding with the reading of the measurement device.

13. The transaction product of claim 1, wherein the electrical circuit includes a liquid crystal display (LCD) screen configured to indicate the reading of the measurement device.

14. The transaction product of claim 1, wherein the electrical circuit includes a plurality of lights, and upon user interaction with the button, the electrical circuit produces a variable light sequence in which individual ones of the plurality of lights are illuminated for relatively short periods of time during a first portion of the variable light sequence, and during a second portion of the variable light sequence, one of the plurality of lights is illuminated for a relatively prolonged period of time, and wherein illumination of the one of the plurality of lights for the relatively prolonged period of time serves as an indication of the reading of the measurement device.

15. The transaction product of claim 1, in combination with a carrier releasably coupled to the support member.

16. A stored-value product comprising:
   machine readable means for linking the stored-value product with an account having a value associated therewith such that the stored-value product can be used as payment toward a purchase of one or more of goods and services;
   means for selectively illuminating each of a plurality of lights in one of two or more available light sequences, wherein:
      each of the two or more available light sequences differs from any other one of the two or more available light sequences,
      the means for selectively illuminating includes means for depicting a simulated meter reading of a user characteristic along a meter field, and
      the plurality of lights includes:
         a first light positioned at a first end of the meter field,

19 a last light positioned at a second end of the meter field spaced from and opposite the first end of the meter field, and
one or more lights positioned between the first light and the last light along the meter field;
means for supporting the means for selectively illuminating and the means for linking; and
means for initiating selective illumination of each of the plurality of lights;
wherein:
upon a first user interaction with the means for initiating selective illumination, the means for selectively illuminating each of the plurality of lights randomly illuminates the plurality of lights in a first one of the two or more available light sequences terminating in a prolonged illumination of any one of the plurality of lights to simulate a first simulated meter reading of the user characteristic along the meter field,
upon a second user interaction with the means for initiating selective illumination, the means for selectively illuminating each of the plurality of lights randomly illuminates the plurality of lights in a second one of the two or more available light sequences terminating in a prolonged illumination of any one of the plurality of lights to simulate a second simulated meter reading of the user characteristic along the meter field.

17. The stored-value product of claim 16, wherein the means for supporting includes means for substantially enclosing the means for selectively illuminating each of a plurality of lights, wherein the means for substantially enclosing includes the means for supporting.

18. A stored-value card linked to an account, the stored-value card comprising:
a simulated meter, which defines a field extending between a first meter limit and a second meter limit, wherein the first meter limit is positioned on an opposite end of the field and is spaced from the second meter limit, and the simulated meter is configured to provide a simulated meter reading presented as corresponding with a user attribute at any one of the first meter limit, the second meter limit, and at a position between the first meter limit and the second meter limit;
a first graphic positioned adjacent the first meter limit and having a first user attribute connotation in agreement with the first meter limit;
a second graphic positioned adjacent the second meter limit and having a second attribute connotation in agreement with the second meter limit;
an electrical circuit configured to randomly indicate a simulated meter reading along the field following interaction by the potential consumer with the electrical circuit, the electrical circuit including a switch configured to initiate the electrical circuit, wherein the electrical circuit includes a switch configured to initiate the electrical circuit to indicate the simulated meter reading following user interaction with the switch;

20 a support member supporting the simulated meter and the electrical circuit; and
a machine readable account identifier linking the stored-value card to the account such that a point-of-sale terminal can activate the account linked to the stored-value card based on the machine readable account identifier to permit subsequent deductions from a value associated with the account for application toward one of a purchase and a use of one or more of goods and services.

19. The system of claim 18, wherein the electrical circuit includes a plurality of lights spaced along the field, and the electrical circuit is configured to indicate the randomly selected reading along the field by illuminating one of the plurality of lights for a prolonged period of time.

20. The system of claim 18, wherein the electrical circuit includes a liquid crystal display (LCD) screen configured to indicate the randomly selected reading by indicating a point along the field.

21. A method of assembling a transaction card, the method comprising:
constructing an enclosure at least partially defining a simulated measurement device measuring a user characteristic and having a plurality of available readings along a scale of readings including a first reading, a last reading opposite the first reading, and at least one other reading between the first reading and the last reading, wherein the enclosure includes two images each positioned near a different one of the first reading and the last reading, each of the images visually providing a measurement value of the respective different one of the first reading and the last reading;
positioning a circuit within the enclosure, wherein
the circuit is configured to randomly indicate one of the plurality of available readings of the user characteristic upon activation of the circuit,
the circuit includes a switch configured to activate the circuit upon user interaction with the switch to initiate random indication of one of the plurality of available readings of the user characteristic, and
positioning the circuit within the enclosure includes aligning the switch with a button indicator on the enclosure; and
applying a machine readable account identifier to the transaction card, wherein the machine readable account identifier links the transaction card to an account.

22. The method of claim 21, wherein the circuit includes a plurality of lights, and the enclosure defines a meter field, and wherein positioning the circuit within the enclosure includes positioning the plurality of lights to be spaced along the meter field, and the circuit is configured to randomly indicate one of the plurality of available readings by illuminating one of the plurality of lights positioned along the meter field.

* * * * *